(12) United States Patent
Guo et al.

(10) Patent No.: US 12,167,439 B2
(45) Date of Patent: Dec. 10, 2024

(54) SYSTEMS AND METHODS FOR HANDLING SIDELINK FEEDBACK SIGNALING

(71) Applicant: QUALCOMM Incorporated, San Diego, CA (US)

(72) Inventors: Hui Guo, Beijing (CN); Sudhir Kumar Baghel, Fremont, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 17/754,010

(22) PCT Filed: Oct. 10, 2020

(86) PCT No.: PCT/CN2020/120106
§ 371 (c)(1),
(2) Date: Mar. 21, 2022

(87) PCT Pub. No.: WO2021/068916
PCT Pub. Date: Apr. 15, 2021

(65) Prior Publication Data
US 2022/0330268 A1 Oct. 13, 2022

(30) Foreign Application Priority Data
Oct. 10, 2019 (WO) ................ PTC/CN2019/110341

(51) Int. Cl.
*H04W 72/10* (2009.01)
*H04L 1/18* (2023.01)
(Continued)

(52) U.S. Cl.
CPC ........... *H04W 72/56* (2023.01); *H04L 1/1812* (2013.01); *H04W 72/0446* (2013.01); *H04W 72/0453* (2013.01); *H04W 92/18* (2013.01)

(58) Field of Classification Search
CPC ............. H04W 72/10; H04W 72/0453; H04W 72/0446; H04W 72/52; H04W 72/569;
(Continued)

(56) References Cited

U.S. PATENT DOCUMENTS 10,396,941 B2 * 8/2019 Khoryaev ............. H04L 1/1854
2018/0206176 A1 * 7/2018 Panteleev ............. H04W 72/20
(Continued)

FOREIGN PATENT DOCUMENTS

CN 104601300 A 5/2015
CN 104954976 A 9/2015
(Continued)

OTHER PUBLICATIONS

"Bengi Aygun et al., Side-Link Assisted Hybrid Automatic Repeat Request for Ultra-Reliable Low Latency Communications, Mar. 2017, WSA 2017, pp. 1-7" (Year: 2017).*
(Continued)

*Primary Examiner* — Rasheed Gidado
(74) *Attorney, Agent, or Firm* — Arun Swain

(57) ABSTRACT

Techniques for handling sidelink feedback signaling in situations where collisions would otherwise be experienced in a network communication link are shown and described. For example, sidelink feedback signaling handling techniques may provide for collision handling when sidelink HARQ is to be simultaneously transmitted with network communication radio interface uplink channel information (e.g., Uu HARQ, SR, CSI, etc.) on one or more Uu channel (e.g., PUSCH, PUSCH, etc.). In operation of sidelink feedback handling, a transmitter or intermediary UE of a sidelink communication link may decide whether and how to forward the sidelink HARQ to a corresponding base station. Other aspects and features are also claimed and described.

30 Claims, 10 Drawing Sheets

(51) Int. Cl.
*H04L 1/1812* (2023.01)
*H04W 72/04* (2023.01)
*H04W 72/0446* (2023.01)
*H04W 72/0453* (2023.01)
*H04W 72/56* (2023.01)
*H04W 92/18* (2009.01)

(58) Field of Classification Search
CPC .... H04W 72/21; H04L 1/1812; H04L 1/1854; H04L 2001/0097
See application file for complete search history.

(56) References Cited

U.S. PATENT DOCUMENTS

| | | | | |
|---|---|---|---|---|
| 2020/0163155 | A1* | 5/2020 | Lee | H04W 72/23 |
| 2020/0178216 | A1* | 6/2020 | Huang | H04W 72/0473 |
| 2022/0321306 | A1* | 10/2022 | Wang | H04L 1/1864 |

FOREIGN PATENT DOCUMENTS

| | | |
|---|---|---|
| CN | 108923894 A | 11/2018 |
| EP | 3618555 A1 | 3/2020 |
| WO | WO-2018203669 A1 | 11/2018 |
| WO | WO-2019156969 A1 | 8/2019 |

OTHER PUBLICATIONS

International Search Report and Written Opinion—PCT/CN2019/110341—ISAEPO—Jul. 9, 2020.
International Search Report and Written Opinion—PCT/CN2020/120106—ISAEPO—Dec. 30, 2020.
ZTE: "Discussion on FeD2D Feedback Scheme", 3GPP TSG RAN WG1 Meeting #89, R1-1707210, Hangzhou, P.R. China May 15-19, 2017, May 19, 2017 (May 19, 2017), 5 Pages, Section 2, Fig. 3.
Asia Pacific Telecom: "Discussion on SL Mode-1 Resource Allocation", 3GPP TSG-RAN WG1 Meeting #98bis, R1-1910848, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 8, 2019, XP051809222, 4 Pages, paragraph [0003], p. 3-p. 4.
Huawei, et al., "Sidelink Resource Allocation Mode 1", 3GPP TSG RAN WG1 Meeting #98bis, R1-1910055, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 8, 2019, XP051809065, 19 Pages, Paragraph [0003], figure 3, Section 3, p. 13-p. 14.
Supplementary European Search Report—EP20873603—Search Authority—The Hague—Sep. 13, 2023.

* cited by examiner

SYSTEMS AND METHODS FOR HANDLING SIDELINK FEEDBACK SIGNALING

CROSS-REFERENCE TO RELATED APPLICATIONS

This application claims priority to co-pending International Patent Application Number PCT/CN2020/120106, entitled, "SYSTEMS AND METHODS FOR HANDLING SIDELINK FEEDBACK SIGNALING," filed Oct. 10, 2020, and also the benefit of International Patent Application Number PCT/CN2019/110341, entitled, "SYSTEMS AND METHODS FOR HANDLING SIDELINK FEEDBACK SIGNALING," filed on Oct. 10, 2019, all contents of these application are incorporated by reference in their entirety.

TECHNICAL FIELD

Aspects of the present disclosure relate generally to wireless communication systems, and more particularly, to sidelink communications. Certain embodiments of the technology discussed below can enable and provide sidelink feedback signaling, such as hybrid automatic repeat request (HARQ), collision handling, as may provide for handling collisions with respect to sidelink HARQ forwarding and radio interface (Uu) network communication.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Sidelink communication capabilities have been developed, for example, to facilitate direct communication between UEs. Sidelink communications allow for communication between two or more nearby UEs, such as using evolved Universal Terrestrial Radio Access Network (E-UTRAN) technology, without the sidelink transmissions passing through a base station. Such sidelink communications can be used for out-of-network coverage scenarios. For example, sidelink communications can be used to enable communications to UEs otherwise outside of a network coverage area. Additionally or alternatively, sidelink communications can be used for public safety communications, such as to provide public safety communications using different standards in different geographical regions (e.g., different countries) to UEs roaming within an area of a network, etc. Sidelink communication functionality can likewise be used in conjunction with conventional wireless communication network connections to mobile networks to enable a wide variety of innovative connected device (e.g., connected car) services.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. The method may include receiving, by a user equipment (UE) operating as an intermediary UE of a sidelink communication link, a sidelink feedback signal from a UE operating as a sidelinked UE of the sidelink communication link. The method may further include implementing, by the intermediary UE, sidelink feedback signaling processing avoiding an impending collision with respect to forwarding the sidelink feedback signaling to a base station over a network communication link and other uplink signaling to the base station over the network communication link.

In an additional aspect of the disclosure, an apparatus configured for wireless communication is provided. The apparatus may include means for a UE operating as an intermediary UE of a sidelink communication link receiving a sidelink feedback signal from a UE operating as a sidelinked UE of the sidelink communication link. The apparatus may further include means for the intermediary UE implementing sidelink feedback signaling processing avoiding an impending collision with respect to forwarding the sidelink feedback signaling to a base station over a network communication link and other uplink signaling to the base station over the network communication link.

In an additional aspect of the disclosure, a non-transitory computer-readable medium having program code for wireless communication recorded thereon. The program code may include program code for causing the computer to receive, by a UE operating as an intermediary UE of a sidelink communication link, a sidelink feedback signal from a UE operating as a sidelinked UE of the sidelink communication link. The program code may further include program code for causing the computer to implement, by the intermediary UE, sidelink feedback signaling processing avoiding an impending collision with respect to forwarding the sidelink feedback signaling to a base station over a network communication link and other uplink signaling to the base station over the network communication link.

In an additional aspect of the disclosure, an apparatus configured for wireless communication is provided. The apparatus includes at least one processor, and a memory coupled to the processor. The at least one processor may be configured to receive, by a UE operating as an intermediary UE of a sidelink communication link, a sidelink feedback signal from a UE operating as a sidelinked UE of the sidelink communication link. The at least one processor may further be configured to implement, by the intermediary UE, sidelink feedback signaling processing avoiding an impending collision with respect to forwarding the sidelink feedback signaling to a base station over a network communication link and other uplink signaling to the base station over the network communication link.

In accordance with some aspects of the disclosure, the methods, apparatuses, and program code of computer-readable medium may be configured for identifying an overlap in an allocation of at least a time or frequency resource for use by the sidelink feedback signaling and the other uplink signaling as the impending collision with respect to forwarding the sidelink feedback signaling.

In accordance with some aspects of the disclosure, the methods, apparatuses, and program code of computer-readable medium may be configured for determining to drop or communicate the sidelink feedback signaling based at least in part on a priority based sidelink feedback signaling rule implemented by the intermediary UE.

In accordance with some aspects of the disclosure, the methods, apparatuses, and program code of computer-readable medium may be configured for determining to drop or communicate the sidelink feedback signaling based at least in part on a priority between the sidelink feedback signaling and at least a portion of the other uplink signaling.

In accordance with some aspects of the disclosure, the methods, apparatuses, and program code of computer-readable medium may be configured for the priority between the sidelink feedback signaling and the at least a portion of the other uplink signaling being based at least in part on an index value associated with the other uplink signaling.

In accordance with some aspects of the disclosure, the methods, apparatuses, and program code of computer-readable medium may be configured for the priority between the sidelink feedback signaling and the at least a portion of the other uplink signaling being based at least in part on a priority value associated with the sidelink feedback signaling.

In accordance with some aspects of the disclosure, the methods, apparatuses, and program code of computer-readable medium may be configured for the priority value associated with the sidelink feedback signaling including a priority value of a sidelink transmission corresponding to the sidelink signaling feedback.

In accordance with some aspects of the disclosure, the methods, apparatuses, and program code of computer-readable medium may be configured for the priority value of the sidelink transmission being based at least in part on a sidelink transmission priority selected from a transmit block priority provided for a transmit block of the sidelink transmission, a transmit block size priority of a transmit block of the sidelink transmission, or a sidelink data retransmission priority of the sidelink transmission.

In accordance with some aspects of the disclosure, the methods, apparatuses, and program code of computer-readable medium may be configured for the sidelink feedback signaling including a sidelink hybrid automatic repeat request (HARQ) response.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
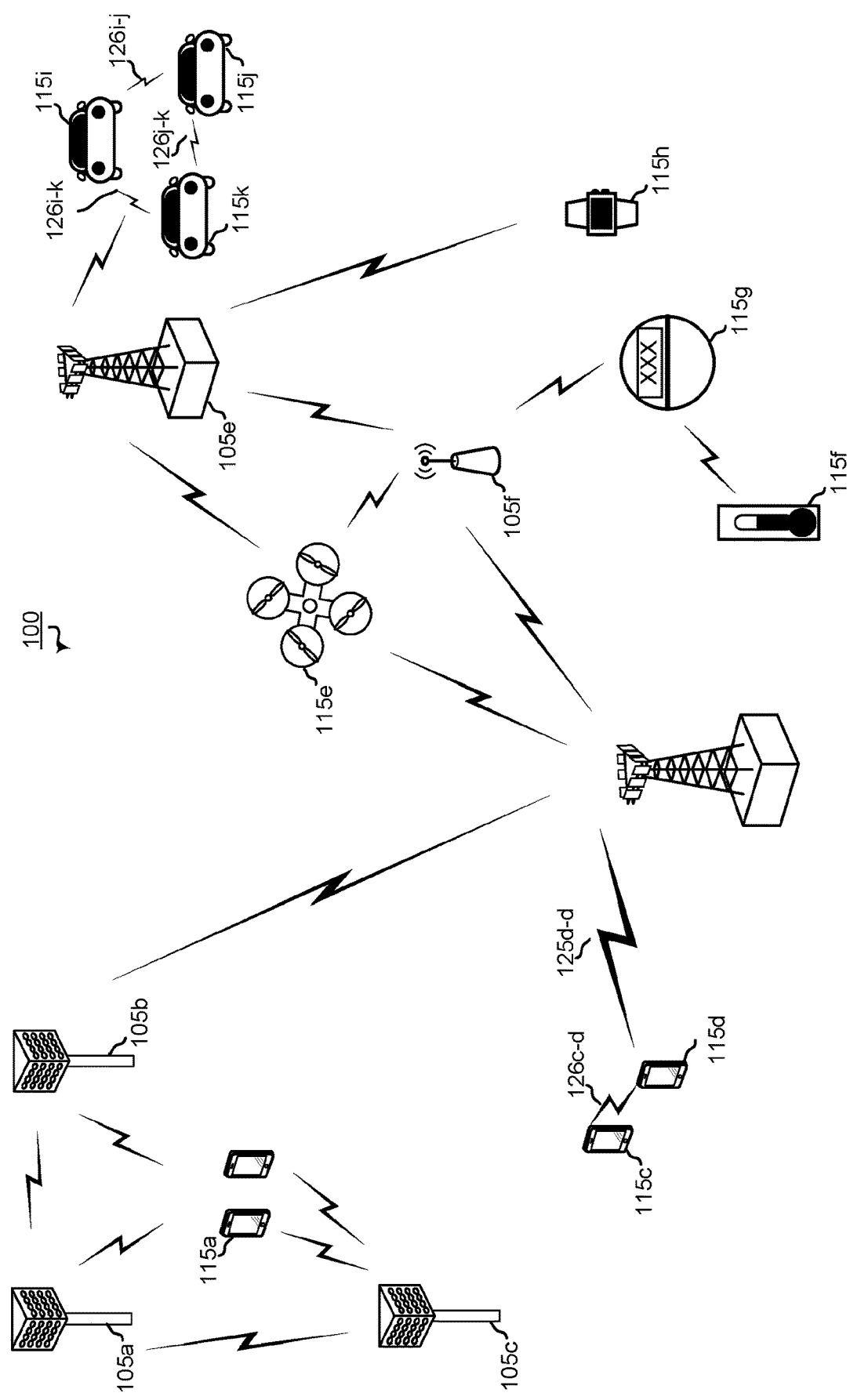
FIG. 1 shows a block diagram illustrating details of a wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NW" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3$^{rd}$ Generation Partnership Project" (3GPP), and cdma2000 is described in documents from an organization named "3$^{rd}$ Generation Partnership Project 2" (3GPP2). These various radio technologies and standards are known or are being developed. For example, the 3$^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec.), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3$^{rd}$ Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of Things" (IoT) or "Internet of Everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such as UE 115e, which is a drone. Redundant communication links with UE 115e include links from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating (e.g., using sidelink communications) with another user device which relays its information to/from the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
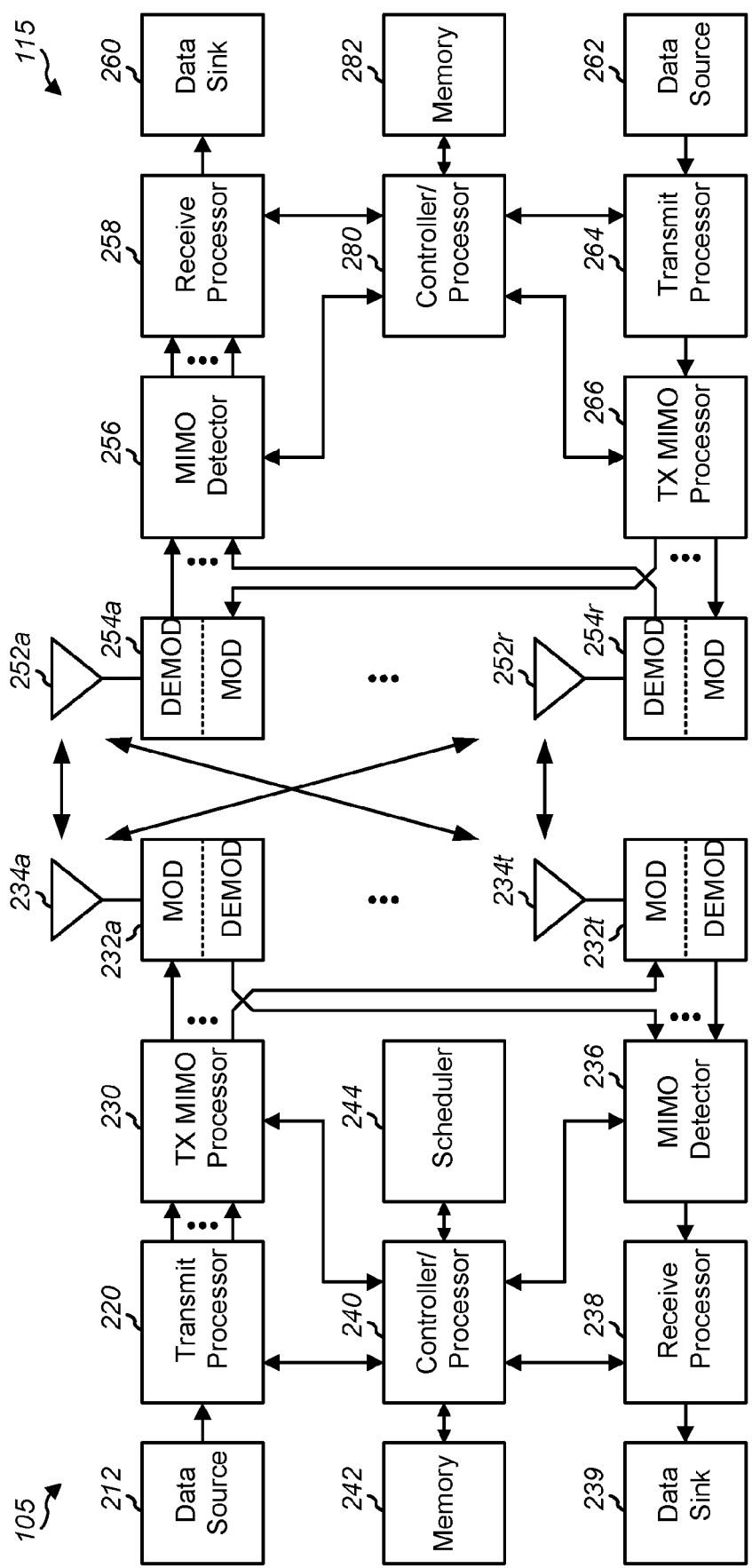
FIG. 2 shows a block diagram conceptually illustrating a design of a base station and a UE configured according to some aspects of the present disclosure.

FIG. 2 shows a block diagram of a design of an example of base station 105 and an example of UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 3, 5, 6A-6C, and 7A-7C, and/or other processes for the techniques described herein. Memories 242 and 282 may store data and program codes for base station 105 and UE 115, respectively. Scheduler 244 may schedule UEs for data transmission on the downlink and/or uplink.

One or more UEs operating in wireless network 100 may be configured with sidelink communication capabilities facilitating direct communication between two or more nearby UEs, such as using E-UTRAN technology, without the sidelink transmissions passing through a base station. UEs 115c, 115d, 115g, and 115i-115j are shown in FIG. 1 as implementing sidelink communication links. Sidelink communication link 126c-d between UEs 115c and 115d may, for example, be implemented with respect to an out-of-network coverage scenario in which UE 115c is disposed in an area at which direct communication with base stations 105 is not available or otherwise inadequate. As another example, sidelink communication links 126i-j, 126j-k, and 126i-k between UEs 115i-115k may be implemented to enable various connected car services. In providing the foregoing sidelink communications between UEs, one of the UEs may implement a communication link with the wireless network (e.g., network communication link 125d-d), such as may comprise a conventional wireless communication link with one or more base stations 105, to operate as an intermediary communication device with respect to a sidelinked UE. An intermediary communication device may, for example, comprise a communication device providing a node in a sidelink communication link with a sidelinked UE, such as a node providing a link between the sidelinked UE and a base station or other network node.

Various feedback signaling may be utilized between the UEs and/or the intermediary UE and a corresponding base station. For example, hybrid automatic repeat request (HARQ) feedback may be utilized in association with sidelink communications. As an example of HARQ feedback, data receipt acknowledgement/negative acknowledgement (e.g. HARQ-ACK and/or HARQ-NACK) may be transmitted by physical sidelink feedback channel (PSFCH) from a receiver UE to a transmitter UE of a sidelink communication pair. In some cases, the transmitter UE (e.g., an intermediary UE) may forward the data receipt acknowledgement/negative acknowledgement from the transmitter UE to a base station, such as via PUCCH/PUSCH, to obtain retransmission resources from the network. This forwarding operation is illustrated in the communication flow diagram of FIG. 3.

Figure 3:
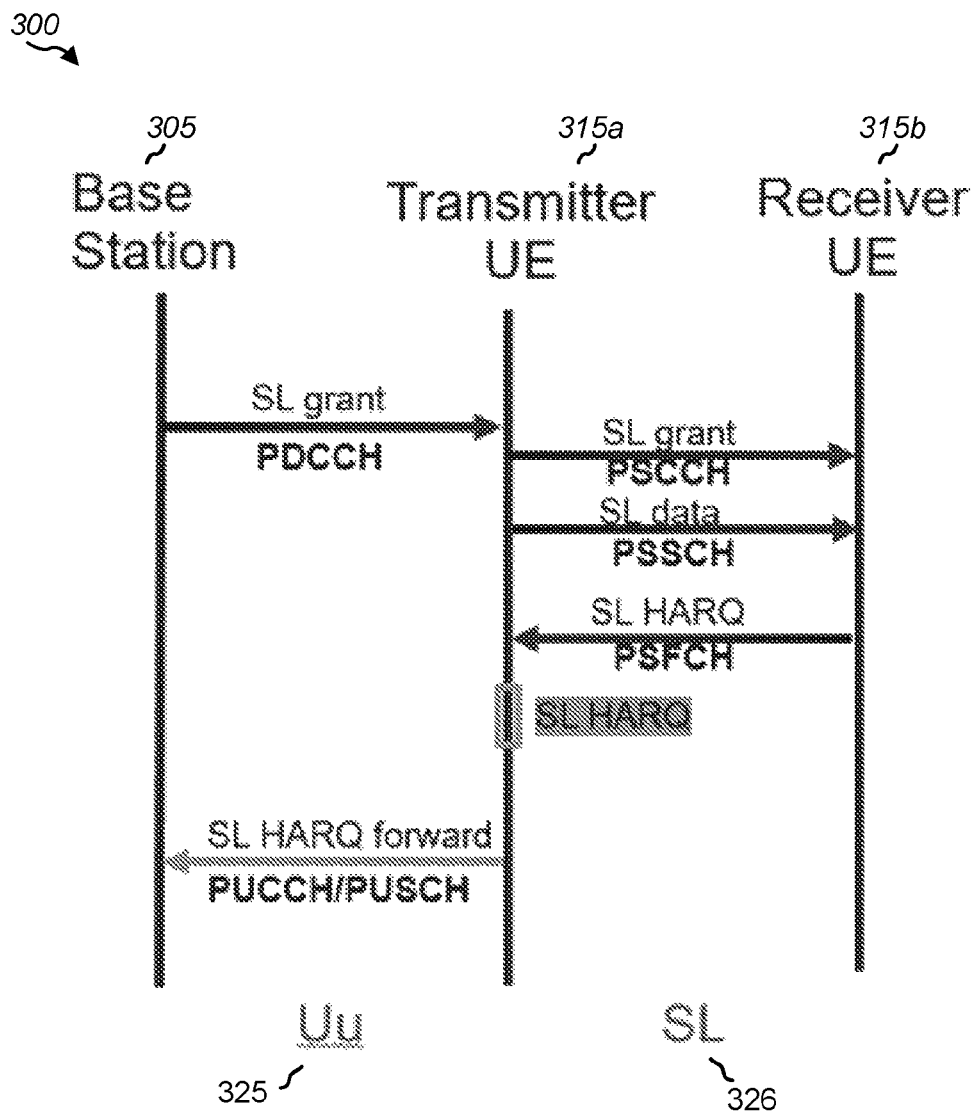
FIG. 3 shows a flow diagram illustrating an example of data receipt acknowledgement/negative acknowledgement forwarding.

In the data receipt acknowledgement/negative acknowledgement forwarding example of flow 300 shown in FIG. 3, a sidelink grant may be made by base station 305 (e.g., any of base stations 105 shown in FIG. 1, such as base stations 105d, 105e, or 105f). The sidelink grant may be communicated by base station 305 to UE 315a (e.g., any of UEs 115 shown in FIG. 1 served by base station 305 and configured operate as an intermediary UE in sidelink communications, such as UEs 115d, 115g, 115i, or 115k) via a PDCCH of network communication link 325 (e.g., any of the network communication links of FIG. 1, such as network communication link 125d-d). UE 315a, operating as a transmitter intermediary UE in this example may correspondingly communicate the sidelink grant via a physical sidelink control channel (PSCCH) of sidelink communication link 326 (e.g., any of the sidelink communication links of FIG. 1, such as sidelink communication links 126c-d, 126i-j, 126j-k, or 126i-k) to UE 315b (e.g., any of UEs 115 within communication range of an intermediary UE and configured to operate as a sidelinked UE, such as UE 115c, 115f, 115i, 115j, or 115k). UE 315a may, in accordance with the sidelink grant, communicate sidelink data to UE 315b, such as via a physical sidelink shared channel (PSSCH) of sidelink communication link 326. Thereafter, sidelink HARQ feedback may be transmitted from the receiver UE to transmitter UE. For example, UE 315b may provide sidelink HARQ feedback to UE 315a, such as via a physical sidelink feedback channel (PSFCH) of sidelink communication link 326. The sidelink HARQ may be forwarded from the transmitter UE to the base station, such as to request one or more retransmission resources. For example, as shown in FIG. 3, UE 315a may forward the sidelink HARQ to base station 305 via a PUCCH/PUSCH of network communication link 325.

Figure 4:
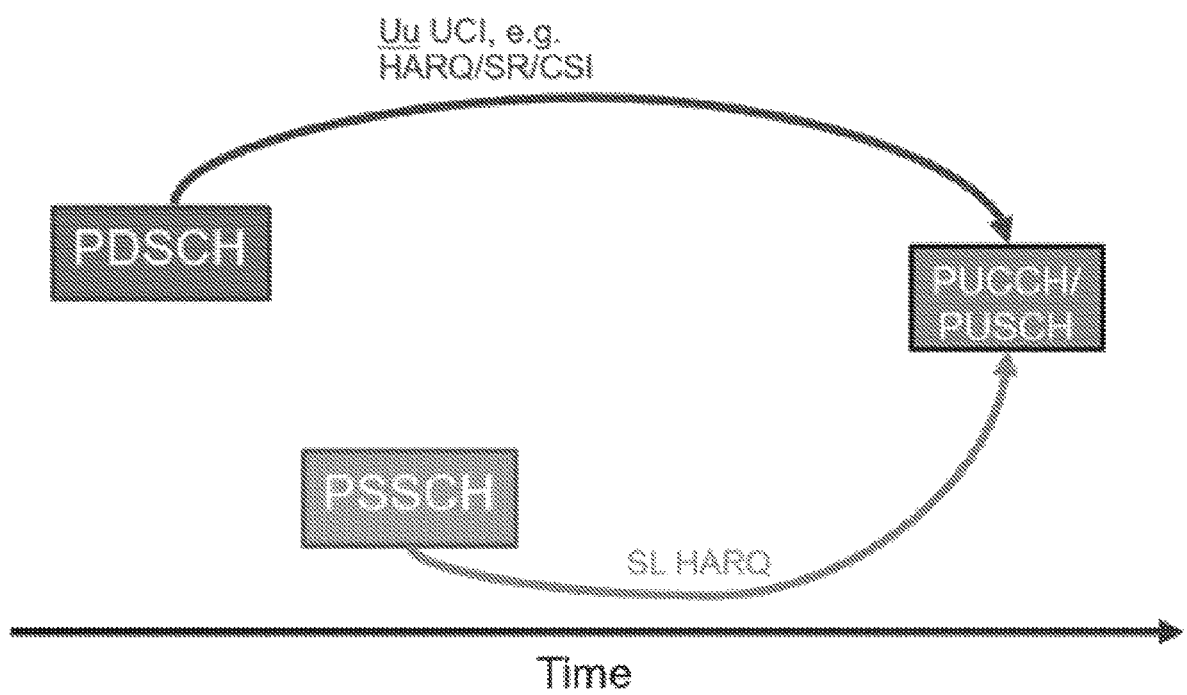
FIG. 4 shows sidelink feedback signaling collided with other uplink signals in a network interface according to some aspects of the present disclosure.

Sidelink HARQ feedback forwarding, such as provided in flow 300 of FIG. 3, may have an impact on the existing radio interface (e.g., radio interface between a mobile and the radio access network, referred to as the Uu interface or Uu) network communication link PUCCH/PUSCH transmissions, such as with respect to collision handling and criterion determination. For example, as illustrated in FIG. 4, sidelink HARQ may be collided with other uplink signals in the Uu interface (e.g., Uu HARQ and/or other uplink channel information (UCI), such as scheduling requests (SR), channel state information (CSI), etc., in the PUCCH and/or with Uu HARQ and/or other UCI, such as SR, CSI, etc., in the PUSCH). As an example of sidelink HARQ colliding with other uplink signals in the Uu interface, the same time and/or frequency resource (e.g., time slot, channel, resource block, etc.) may be scheduled for UE 315a, operating as the intermediary UE in the sidelink communication link, to both forward sidelink HARQ to base station 305 and communicate one or more other uplink signals (e.g., Uu HARQ, SR, CSI, etc.) to base station 305.

Techniques for handling sidelink feedback signaling in situations where collisions would otherwise be experienced in a network communication link are provided according to aspects of the present disclosure. For example, sidelink feedback signaling handling techniques of some implementations provide for collision handling when sidelink HARQ is to be simultaneously transmitted with Uu UCI (e.g., Uu HARQ, SR, CSI, etc.) on one or more Uu channel (e.g., PUCCH, PUSCH, etc.). In operation of sidelink feedback signaling handling according to aspects of the present disclosure, a transmitter or intermediary UE of a sidelink communication link decides whether and how to forward the sidelink HARQ to a corresponding base station.

Figure 5:
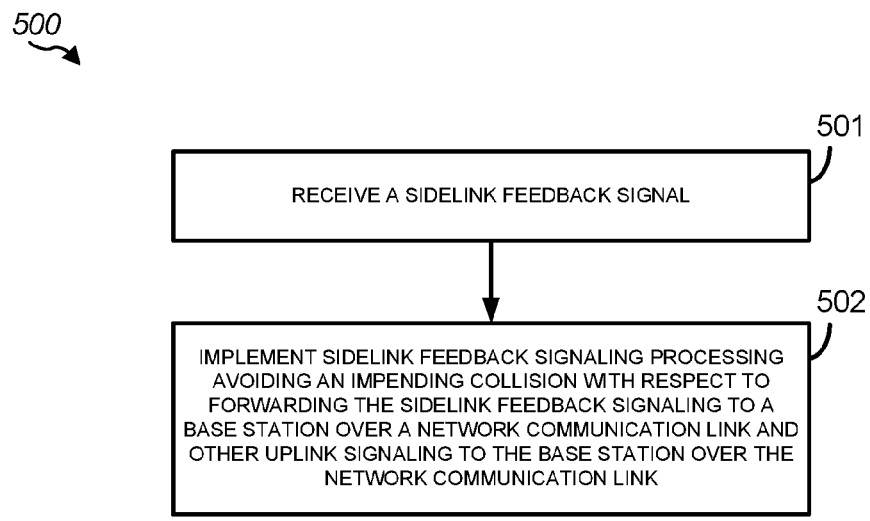
FIGS. 5, 6A-6C, and 7A-7C show flow diagrams illustrating sidelink feedback signaling handling operation according to some aspects of the present disclosure.

FIG. 5 shows a flow diagram implementing techniques for handling sidelink feedback signaling in situations where collisions would otherwise be experienced in a network communication link according to aspects of the present disclosure. The functions of flow 500 may, for example, be performed by sidelink feedback signaling logic of a UE (e.g., any of UEs 115 of FIG. 1) configured for handling sidelink feedback signaling according to aspects of the present disclosure. The sidelink feedback signaling logic may, for example, comprise program code stored in memory accessible to the UE (e.g., memory 282 of FIG. 2) which when executed by one or more processors of the UE (e.g., a processor of controller/processor 280) operates to provide functions as described herein (e.g., controlling transmit processor with respect to transmission of sidelink feedback signaling).

In the exemplary sidelink feedback signaling handling operation of flow 500 in FIG. 5, a sidelink feedback signal is received at block 501. For example, a UE operating as an intermediary UE with respect to a sidelink communication link may receive sidelink feedback signaling (e.g., sidelink HARQ) from a corresponding sidelinked UE, such as for forwarding the sidelink feedback signaling to a base station or other network entity.

At block 502 of the illustrated example of flow 500, sidelink feedback signaling processing avoiding an impending collision with respect to forwarding the sidelink feedback signaling to a base station over a network communication link and other uplink signaling to the base station over the network communication link is implemented. For example, the intermediary UE may identify an impending collision with respect to forwarding the sidelink feedback signaling and the other uplink signaling communication of the sidelink feedback signaling and other uplink signaling from the intermediary UE, such as due to an overlap in an allocation of at least a time or frequency resource for use by the sidelink feedback signaling and other uplink signaling. Accordingly, the intermediary UE may determine whether and/or how to forward the sidelink feedback signaling to the base station. For example, the intermediary UE may determine to drop the sidelink feedback signaling and to communicate the other uplink signaling to the base station. Similarly, the intermediary UE may determine to drop the other uplink signaling and to communicate the sidelink feedback signaling to the base station. Further detail with respect to operation implementing sidelink feedback signaling handling according to aspects of the present disclosure is provided below with reference to FIGS. 6A-6C and 7A-7C. Although specific examples are given in the sidelink feedback signaling handling operation described below in order to aid in understanding the concepts of the present disclosure, it should be appreciated that the examples are non-limiting with respect to the applicability of the concepts here.

Figure 6A:
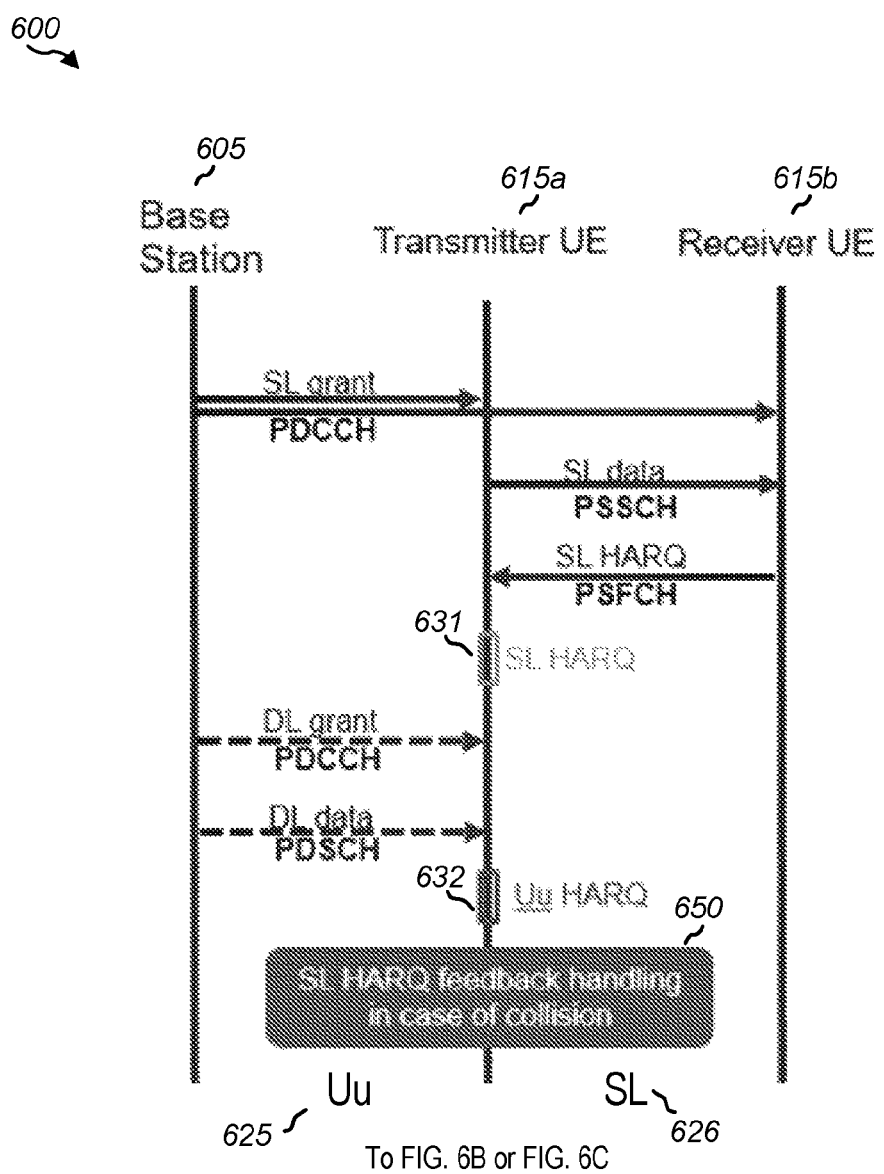
Figure 6B:
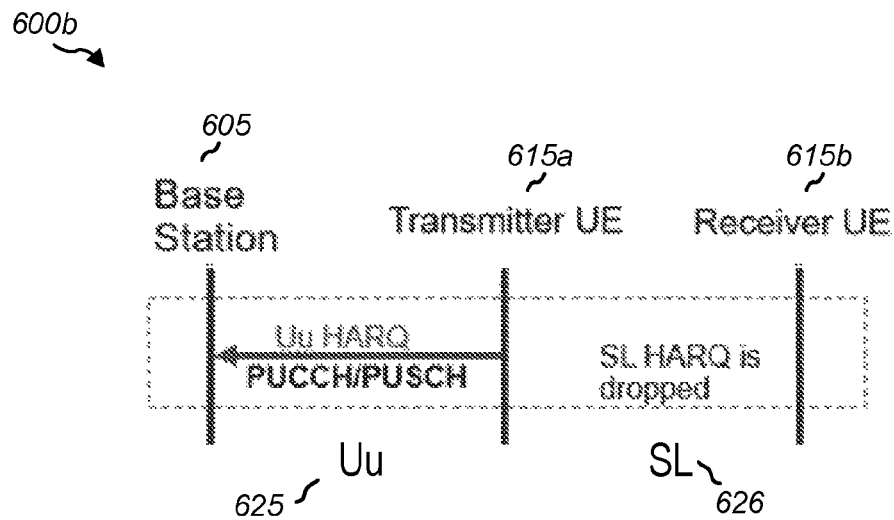
Figure 6C:
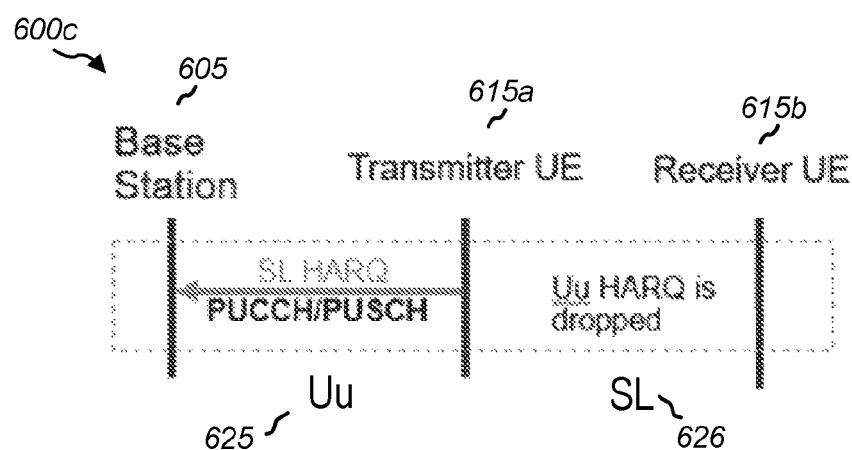

FIGS. 6A-6C show operation implementing sidelink feedback signaling handling according to aspects of the present disclosure. In the example of flow 600 shown in FIG. 6A, sidelink feedback signaling comprises sidelink HARQ provided by a sidelinked UE (UE 615b) to a UE (UE 615a) operating as an intermediary in a sidelink communication link with the sidelinked UE, such as for forwarding to a corresponding base station (base station 605). In this exemplary implementation, base station 605 may correspond to any of base stations 105 shown in FIG. 1, such as base stations 105d, 105e, or 105f, UE 615A may correspond to any of UEs 115 shown in FIG. 1 served by base station 605 and configured operate as an intermediary UE in sidelink communications, such as UEs 115d, 115g, 115i, or 115k, and UE 615b may correspond to any of UEs 115 shown in FIG. 1 within communication range of an intermediary UE and configured to operate as a sidelinked UE, such as UE 115c, 115f, 115i, 115j, or 115k.

In the exemplary operation of flow 600 shown in FIG. 6A, a sidelink grant may be made by base station 605. With resource allocation mode 1, for example, a dynamic or configured sidelink grant may provide resources for one or multiple sidelink transmissions. The sidelink grant may be communicated by base station 605 to UE 615a, which is served by base station 605 and configured operate as an intermediary UE in sidelink communications, via a PDCCH of network communication link 625. Network communication link 625 may, for example, comprise a Uu network communication link such as network communication link 125d-d of FIG. 1. UE 615a, operating as a transmitter intermediary UE in this example, may correspondingly communicate the sidelink grant via a physical sidelink control channel (PSCCH) of sidelink communication link 626 to UE 615b, which is within communication range of UE 615a and configured to operate as a sidelinked UE. Sidelink communication link 626 may, for example, comprise any of the sidelink communication links of FIG. 1, such as sidelink communication links 126c-d, 126i-j, 126j-k, or 126i-k. UE 615a may, in accordance with the sidelink grant, communicate sidelink data (e.g., data sourced by UE 615a and/or data relayed from base station 605 by UE 615a) to UE 615b, such as via a physical sidelink shared channel (PSSCH) of sidelink communication link 626. Thereafter, sidelink HARQ feedback (e.g., SL HARQ 631) may be transmitted from UE 615b to UE 615a, such as via a physical sidelink feedback channel (PSFCH) of sidelink communication link 626.

The sidelink HARQ may be intended for forwarding from UE 615a via network communication link 625 to base station 605, such as to request one or more retransmission resources. However, UE 615a may itself have one or more other uplink UCI (e.g., Uu HARQ, SR, CSI, etc.) to communicate to base station 605 via network communication link 625. For example, as shown in exemplary flow 600, UE 615a may have received a downlink grant from base station 605 (e.g., via a PDCCH of network communication link 625) and corresponding downlink data (e.g., via a PDSCH of network communication link 625). Accordingly, UE 615a may have Uu HARQ feedback (e.g., Uu HARQ 632) and/or other uplink signals to be transmitted from UE 615a to base station 605. Where the same time and/or frequency resource (e.g., time slot, channel, resource block, etc.) is scheduled for UE 615a to both forward the sidelink HARQ to base station 605 and to communicate the Uu HARQ and/or one or more other uplink signals to base station 605, the sidelink HARQ may be collided with the other uplink signals in the Uu interface.

UE 615a shown in the example of FIG. 6A is configured to implement a sidelink feedback signaling technique according to aspects of the present disclosure. In particular, UE 615a comprises sidelink feedback signaling logic configured to decide whether and how to forward the sidelink feedback signaling (e.g., SL HARQ 631) to corresponding base station 605. The sidelink feedback signaling logic may, for example, comprise program code stored in memory accessible to the UE (e.g., memory 282 of FIG. 2) which when executed by one or more processors of the UE (e.g., a processor of controller/processor 280) operates to provide functions as described herein (e.g., controlling transmit processor with respect to transmission of sidelink feedback signaling).

In accordance with example flow 600 of FIG. 6A, sidelink feedback signaling logic of UE 615a implements sidelink feedback signaling processing 650 to handle sidelink feedback signaling in situations where collisions would otherwise be experienced in network communication link 625. For example, the sidelink feedback signaling logic may analyze the sidelink feedback signaling, Uu uplink signaling, aspects of network communication resources (e.g., uplink grants, resource block allocations, transmission block utilization, etc.) to identify an impending collision with respect to communication of the sidelink feedback signaling and other uplink signaling. Impending collisions may, for example, comprise identification of an overlap in the allocation of one or more time and/or frequency resources for use by the sidelink feedback signaling and other uplink signaling.

In accordance with some aspects of the present disclosure, when an impending collision with respect to communication of the sidelink feedback signaling and other uplink signaling is identified, sidelink feedback signaling processing 650 of the sidelink feedback signaling logic makes a determination regarding handling of the sidelink feedback signaling. For example, when an impending collision with respect to communication of the sidelink feedback signaling and other uplink signaling is identified, sidelink feedback signaling processing 650 may determine to drop the sidelink feedback signaling and communicate the other uplink signaling in order to avoid the collision. This operation is illustrated in the example of flow 600b of FIG. 6B (e.g., Uu HARQ 632 is communicated by UE 615a to base station 605 via a PUCCH or PUSCH of network communication link 625), as may be invoked by the sidelink feedback signaling logic to follow flow 600. Alternatively, when an impending collision with respect to communication of the sidelink feedback signaling and other uplink signaling is identified, sidelink feedback signaling processing 650 may determine to drop the some or all of the other uplink signaling (e.g., that portion of the other uplink signaling that would overlap the sidelink feedback signaling) and communicate the sidelink feedback signaling in order to avoid the collision. This operation is illustrated in the example of flow 600c of FIG. 6C (e.g., SL HARQ 631 is communicated by UE 615a to base station 605 via a PUCCH or PUSCH of network communication link 625), as may be invoked by the sidelink feedback signaling logic to follow flow 600.

Determinations with respect to whether to communicate or drop sidelink feedback signaling and/or to communicate or drop other uplink signaling may be variously based according to aspects of the present disclosure. Some implementations may, for example, be configured (e.g., at a time of deployment, when joining a particular network, when establishing a communication link with a particular base station, etc.) to drop sidelink feedback signaling when an impending collision is identified, wherein the determination to communicate or drop signaling is based upon this configuration attribute. Alternatively, some implementations may be configured (e.g., at a time of deployment, when joining a particular network, when establishing a communication link with a particular base station, etc.) to drop other uplink signaling (e.g., Uu HARQ, SR, CSI, etc.) when an impending collision is identified, wherein the determination to communicate or drop signaling is based upon this configuration attribute. Additionally or alternatively, some implementations may base determinations to communicate or drop signaling upon higher layer signaling, such as signaling regarding sidelink feedback signaling handling provided to the UE from the network (e.g., a base station, an access and mobility management function (AMF), etc.). Such higher layer signaling may, for example, provide signaling to configure the UE to drop sidelink feedback signaling when an impending collision is identified, to drop other uplink signaling when an impending collision is identified, to dynamically determine to drop sidelink feedback signaling or other uplink signaling when an impending collision is identified, etc. Some implementations of sidelink feedback signaling handling according to aspects of the present disclosure may, for example, determine to communicate or drop signaling based upon one or more predefined rules (e.g., sidelink feedback signaling rules).

Determinations to communicate or drop signaling based upon one or more predefined rules may utilize various attributes regarding a sidelink communication link, a network communication link, data being communicated, devices transmitting and/or receiving data communication, etc. Examples of the various attributes utilized according to some aspects of the present disclosure include HARQ mode, data priority level, data size, data retransmission attempt, etc., as well as combinations thereof.

As an example of a determination to communicate or drop signaling based upon predefined rules, a sidelink feedback signaling rule may provide for dropping or communicating sidelink feedback signaling when an impending collision is identified based upon a HARQ mode implemented by the sidelinked UE (e.g., UE 615b). For example, sidelink feedback signaling processing 650 of the sidelink feedback signaling logic of UE 615a may determine to drop Uu HARQ 632 and communicate sidelink HARQ 631 (e.g., invoke flow 600c of FIG. 6C) when an impending collision is identified and UE 615b is operating according to a "NACK-only" HARQ mode. Such a rule facilitates obtaining a retransmission resource from the network for the sidelink data when the sidelinked UE has been unable to recover the data. Sidelink feedback signaling processing 650 of the sidelink feedback signaling logic of UE 615a may implement one or more other sidelink feedback signaling rules (e.g., based upon a sidelink communication link, a network communication link, data being communicated, devices transmitting and/or receiving data communication, etc.) when an impending collision is identified and UE 615b is operating according to a "ACK/NACK" HARQ mode. Such rules may, for example, facilitate fairness in obtaining retransmission resources from the network for the sidelink data and Uu data when the intermediary UE and sidelinked UE have been unable to recover data.

In another example of a determination to communicate or drop signaling based upon predefined rules, a sidelink feedback signaling rule may provide for dropping or communicating sidelink feedback signaling when an impending collision is identified based upon a priority determination. For example, data priority, size priority, retransmission priority, etc. may be utilized in determining to communicate or drop signaling according to aspects of the present disclosure.

Figure 7A:
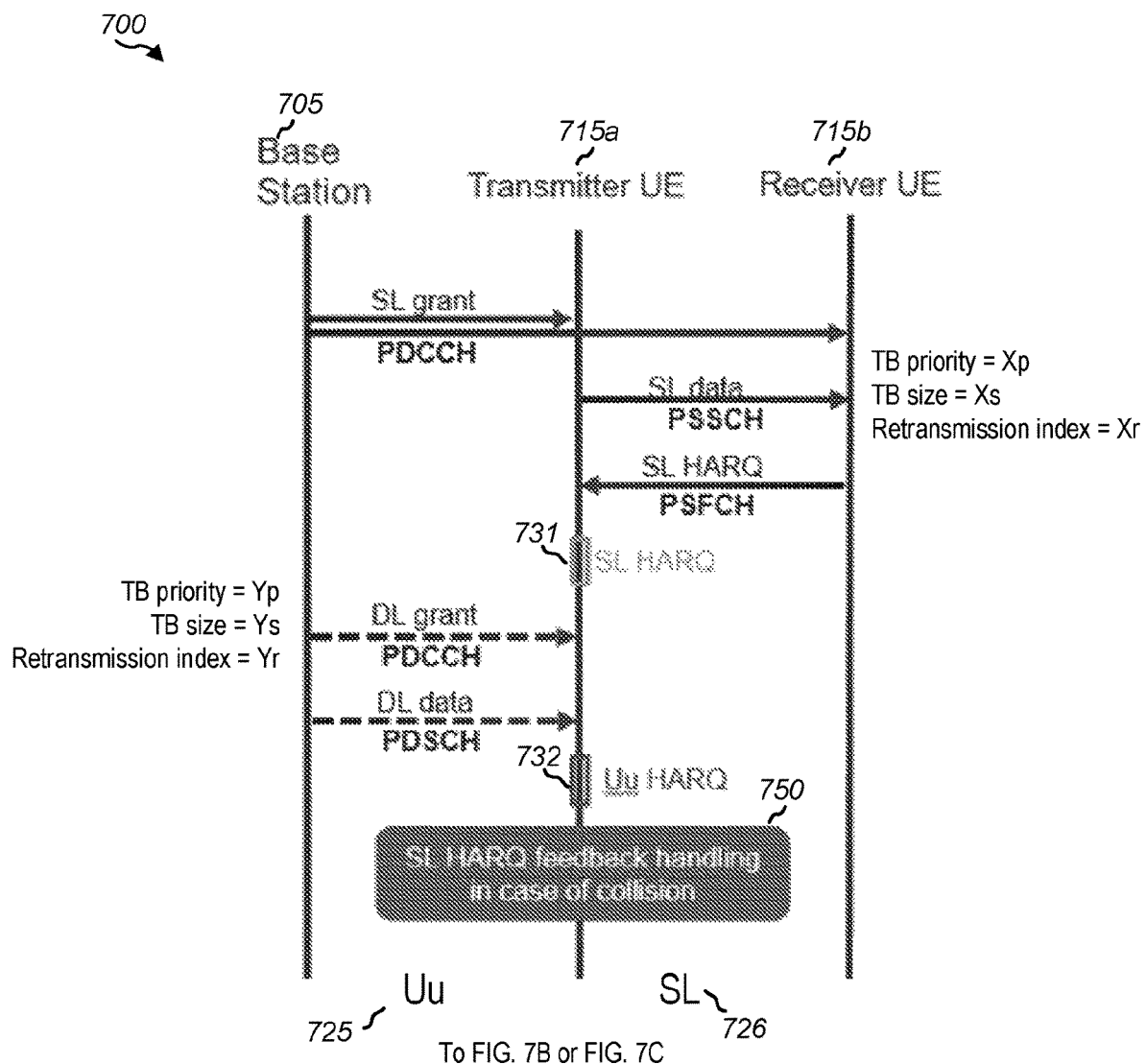
Figure 7B:
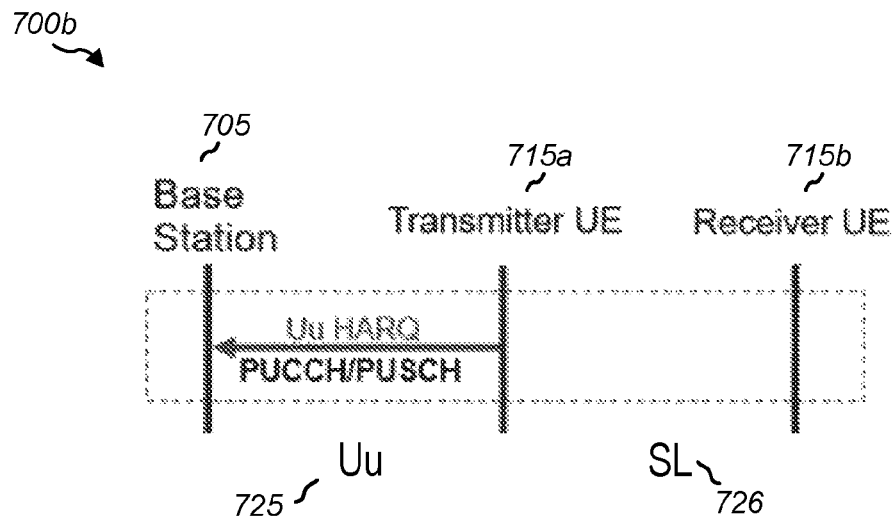
Figure 7C:
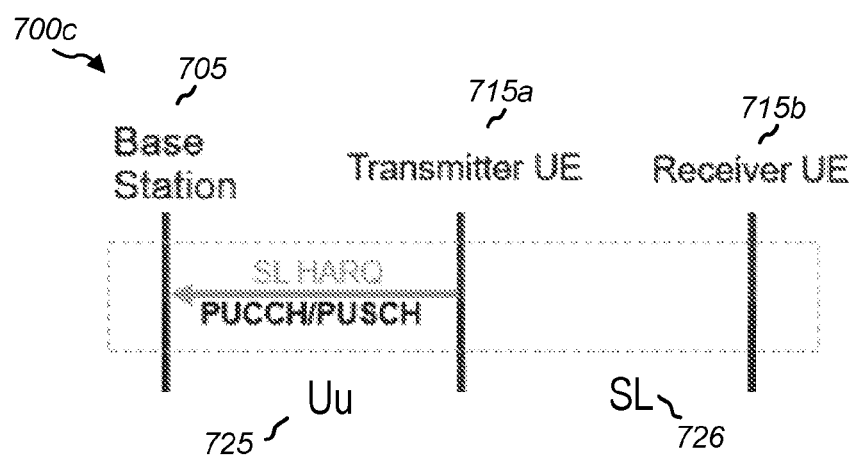

FIGS. 7A-7C show operation implementing sidelink feedback signaling handling wherein a determination to communicate or drop signaling is based upon a predefined rule utilizing priority information according to aspects of the present disclosure. Similar to the example of FIGS. 6A-6C, in the example of flow 700 shown in FIG. 7 the sidelink feedback signaling comprises sidelink HARQ provided by a sidelinked UE (UE 715b) to a UE (UE 715a) operating as an intermediary in a sidelink communication link with the sidelinked UE, such as for forwarding to a corresponding base station (base station 705). As in the above example, base station 705 may correspond to any of base stations 105 shown in FIG. 1, such as base stations 105*d*, 105*e*, or 105*f*, UE 715A may correspond to any of UEs 115 shown in FIG. 1 served by base station 705 and configured operate as an intermediary UE in sidelink communications, such as UEs 115*d*, 115*g*, 115*i*, or 115*k*, and UE 715*b* may correspond to any of UEs 115 shown in FIG. 1 within communication range of an intermediary UE and configured to operate as a sidelinked UE, such as UE 115*c*, 115*f*, 115*i*, 115*j*, or 115*k*.

UE 715*a* comprises sidelink feedback signaling logic configured to decide whether and how to forward the sidelink feedback signaling (e.g., SL HARQ 731) to corresponding base station 705. The sidelink feedback signaling logic may, for example, comprise program code stored in memory accessible to the UE (e.g., memory 282 of FIG. 2) which when executed by one or more processors of the UE (e.g., a processor of controller/processor 280) operates to provide functions as described herein (e.g., controlling transmit processor with respect to transmission of sidelink feedback signaling). The sidelink feedback signaling logic of UE 715*a* implements sidelink feedback signaling processing 750 to handle sidelink feedback signaling in situations where collisions would otherwise be experienced in network communication link 725 (e.g., SL HARQ 731 may have been transmitted from UE 715*b* to UE 715*a* via sidelink communication link 726 for forwarding to base station 705 via network communication link 725 and UE 715*a* may have Uu HARQ 732 and/or other uplink signals to be transmitted from UE 715*a* to base station 705 via network communication link 725).

In accordance with some aspects of the present disclosure, sidelink feedback signaling handling operation according to flow 700 may base a determination to communicate or drop signaling upon a predefined rule utilizing data priority. For example, data priority information may be provided with respect to the sidelink data of UE 715*b* and/or the downlink data of UE 715*a*. In the illustrated example of flow 700, a transmission block priority level (e.g., TB priority=Xp) may be provided (e.g., from a high layer of the network communication link, such as in indicated by sidelink control information) with respect to the sidelink data corresponding to sidelink HARQ 731 and/or a transmission block priority level (e.g., TB priority=Yp) may be provided (e.g., from a high layer of the network communication link, such as in network link configuration information) with respect to downlink data corresponding to Uu HARQ 732. Sidelink feedback signaling processing 750 of the sidelink feedback signaling logic of UE 715*a* may analyze such transmission block priority level information to determine whether to drop Uu HARQ 732 and communicate sidelink HARQ 731 or to drop sidelink HARQ 531 and communicate Uu HARQ 732. For example, if it is determined that the transmission block priority level (Yp) of the downlink data corresponding to Uu HARQ 732 is greater than the transmission block priority level (Xp) of the sidelink data corresponding to sidelink HARQ 731 (Yp>Xp), sidelink feedback signaling processing 750 may determine that sidelink HARQ 731 is to be dropped and Uu HARQ 732 is to be communicated (e.g., invoke flow 700*b* of FIG. 7B). However, if it is determined that the transmission block priority level (Xp) of the sidelink data corresponding to sidelink HARQ 731 is greater than or equal to the transmission block priority level (Yp) of the downlink data corresponding to Uu HARQ 732 (Xp≥Yp), sidelink feedback signaling processing 750 may determine that Uu HARQ 732 is to be dropped and sidelink HARQ 731 is to be communicated (e.g., invoke flow 700*c* of FIG. 7C). If the reported HARQ is for multiple transmission blocks, the priority may be defined based on the minimal or maximum or average priority for the transmission blocks. Data priority based rules may, for example, facilitate obtaining retransmission resources from the network for data having a higher priority when the intermediary UE and sidelinked UE have been unable to recover data.

Additionally or alternatively, sidelink feedback signaling handling operation according to flow 700 may base a determination to communicate or drop signaling upon a predefined rule utilizing size priority. For example, transmission block size information may be obtained for the sidelink data of UE 715*b* and/or the downlink data of UE 715*a*. In the illustrated example of flow 700, a transmission block size (e.g., TB size=Xs) may be determined (e.g., from analyzing the sidelink data block size, from a transmission block size configured with respect to the sidelink, etc.) with respect to the sidelink data corresponding to sidelink HARQ 731 and/or a transmission block size (e.g., TB size=Ys) may be determined (e.g., from analyzing the downlink data block size, from a transmission block size configured with respect to the downlink, etc.) with respect to downlink data corresponding to Uu HARQ 732. Sidelink feedback signaling processing 750 of the sidelink feedback signaling logic of UE 715*a* may analyze such transmission block size information in combination with a transmission block size rule establishing sized-based priority to determine whether to drop Uu HARQ 732 and communicate sidelink HARQ 731 or to drop sidelink HARQ 531 and communicate Uu HARQ 732. For example, if it is determined that the transmission block size (Ys) of the downlink data corresponding to Uu HARQ 732 is greater than the transmission block size (Xs) of the sidelink data corresponding to sidelink HARQ 731 (Ys>Xs), sidelink feedback signaling processing 750 may determine that sidelink HARQ 731 is to be dropped and Uu HARQ 732 is to be communicated (e.g., invoke flow 700B of FIG. 7B). However, if it is determined that the transmission block size (Xs) of the sidelink data corresponding to sidelink HARQ 731 is greater than or equal to the transmission block size (Ys) of the downlink data corresponding to Uu HARQ 732 (Xs≥Ys), sidelink feedback signaling processing 750 may determine that Uu HARQ 732 is to be dropped and sidelink HARQ 731 is to be communicated (e.g., invoke flow 700*c* of FIG. 7C). If the feedback signaling corresponds to multiple transmission blocks, the transmission block size may be the maximum transmission block or sum of all transmission blocks indicated by this feedback signaling. Size priority based rules may, for example, facilitate obtaining retransmission resources from the network for the larger portions of unrecovered data when the intermediary UE and sidelinked UE have been unable to recover data.

Further, sidelink feedback signaling handling operation according to flow 700 may additionally or alternatively base a determination to communicate or drop signaling upon a predefined rule utilizing retransmission priority. For example, retransmission data information (e.g., a number of times data retransmission has been requested or attempted) may be obtained for the sidelink data of UE 715*b* and/or the downlink data of UE 715*a*. In the illustrated example of flow 700, a retransmission index value (e.g., retransmission index=Xr) may be determined (e.g., from analyzing the number of retransmission attempts made with respect to the sidelink data, from a retransmission index of a previous transmission block of the sidelink, etc.) with respect to the sidelink data corresponding to sidelink HARQ 731 and/or a retransmission index value (e.g., retransmission index=Yr) may be determined (e.g., from analyzing the number of retransmission attempts made with respect to the downlink data, from a retransmission index of a previous transmission block of the downlink, etc.) with respect to downlink data corresponding to Uu HARQ 732. Sidelink feedback signaling processing 750 of the sidelink feedback signaling logic of UE 715a may analyze such retransmission information in combination with a rule establishing retransmission priority to determine whether to drop Uu HARQ 732 and communicate sidelink HARQ 731 or to drop sidelink HARQ 731 and communicate Uu HARQ 732. For example, if it is determined that the retransmission index value (Yr) of the downlink data corresponding to Uu HARQ 732 is greater than the retransmission index value (Xr) of the sidelink data corresponding to sidelink HARQ 731 (Yr>Xr), sidelink feedback signaling processing 750 may determine that sidelink HARQ 731 is to be dropped and Uu HARQ 732 is to be communicated (e.g., invoke flow 700B of FIG. 7B). However, if it is determined that the retransmission index value (Xr) of the sidelink data corresponding to sidelink HARQ 731 is greater than or equal to the retransmission index value (Yr) of the downlink data corresponding to Uu HARQ 732 (Xr≥Yr), sidelink feedback signaling processing 750 may determine that Uu HARQ 732 is to be dropped and sidelink HARQ 731 is to be communicated (e.g., invoke flow 700c of FIG. 7C). If the feedback signaling corresponds to multiple transmission blocks, the retransmission information of all transmission blocks indicated by this feedback signaling may be averaged. Retransmission priority based rules may, for example, facilitate obtaining retransmission resources from the network for unrecovered data which has experienced the greatest difficulty in reaching the intended UE when the intermediary UE and sidelinked UE have been unable to recover data (e.g., transmission blocks with more retransmission times may be given higher priority to request retransmission resource).

Various of the determinations regarding communicating or dropping signaling in sidelink feedback signaling handling operation may be used in combination according to aspects of the present disclosure. For example, combinations of data priority, size priority, and/or retransmission priority rules may be implemented by sidelink feedback signaling logic. As a specific example, where data priority information provides a same priority level (or is not provided) with respect to the sidelink data and the downlink data, one or more size priority information and/or retransmission priority information may be analyzed in determining to communicate or drop signaling feedback.

Although examples have been discussed with respect to impending collisions between sidelink HARQ and Uu HARQ, sidelink feedback signaling handling operation according to aspects of the present disclosure is applicable with respect to Uu signaling in addition to Uu HARQ. For example, sidelink feedback signaling processing 750 of the sidelink feedback signaling logic of UE 715a may provide for dropping or communicating sidelink feedback signaling when an impending collision is identified based upon a priority determination using UCI content information. In operation according to some aspects of the present disclosure, a predefined rule utilizing priority information may establish signaling feedback priority such that SR is communicated and sidelink HARQ dropped, whereas sidelink HARQ is communicated and UCI other than SR is dropped, perhaps combined with one or more of the above rules regarding determinations as between sidelink HARQ and Uu HARQ for use when UCI includes Uu HARQ (e.g., SR>SL HARQ>UCI other than SR/HARQ). As another example, in operation according to some aspects of the present disclosure, a predefined rule utilizing priority information may establish signaling feedback priority such that sidelink HARQ is communicated and SR is dropped, whereas SR is communicated SR is communicated and UCI other than sidelink HARQ is dropped, perhaps combined with one or more of the above rules regarding determinations as between sidelink HARQ and Uu HARQ for use when UCI includes Uu HARQ (e.g., SL HARQ>SR>UCI other than SR/HARQ). As yet another example, in operation according to some aspects of the present disclosure, a predefined rule utilizing priority information may establish signaling feedback priority such that Uu UCI is communicated and sidelink HARQ is dropped (e.g., Uu UCI>SL HARQ).

Figure 8:
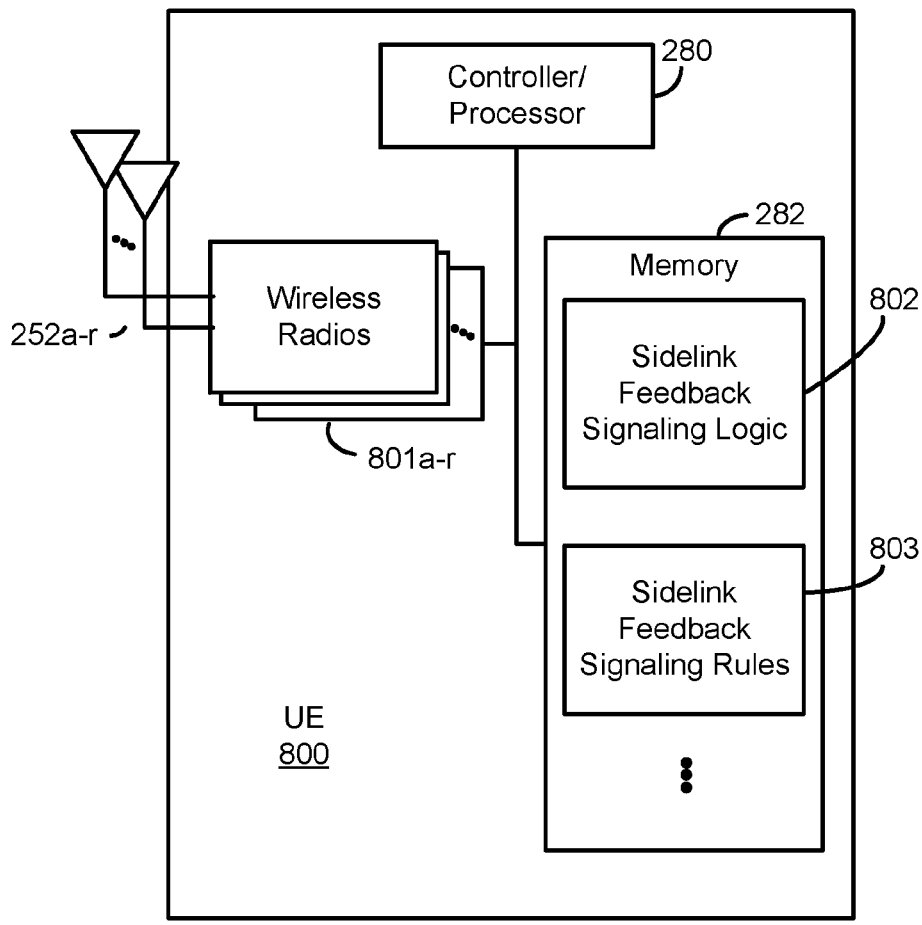
FIG. 8 is a block diagram conceptually illustrating a design of a UE configured to perform sidelink feedback signaling handling according to some aspects of the present disclosure.

FIG. 8 is a block diagram illustrating example blocks executed to implement aspects of the present disclosure. UE 115 of FIG. 8 includes the structure, hardware, and components as illustrated for UE 115 of FIG. 2, and thus is described with respect to UE 115 as illustrated in FIG. 2. For example, UE 115 includes controller/processor 280, which operates to execute logic or computer instructions stored in memory 282, as well as controlling the components of UE 115 that provide the features and functionality of UE 115. In accordance with aspects of the present disclosure, controller/processor 280 executes logic of sidelink feedback signaling logic 802, possibly using one or more predefined rules of sidelink feedback signaling rules 803, to provide sidelink feedback signaling handling operation as described above. UE 115, under control of controller/processor 280, transmits and receives signals (e.g., the above mentioned sidelink feedback signaling and/or other uplink signaling) via wireless radios 800a-r and antennas 252a-r. Wireless radios 800a-r include various components and hardware, as illustrated in FIG. 2 for UE 115, including modulator/demodulators 254a-r, MIMO detector 256, receive processor 258, transmit processor 264, and TX MIMO processor 266.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 2 and 8) may comprise processors, electronics devices, hardware devices, electronics components, logical circuits, memories, software codes, firmware codes, etc., or any combination thereof. In addition, features discussed herein relating to handling sidelink feedback signaling may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 5, 6A, and 7A) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
   receiving, by a user equipment (UE) operating as an intermediary UE of a sidelink communication link, sidelink feedback signaling from a UE operating as a sidelinked UE of the sidelink communication link, wherein the sidelink feedback signaling comprises a sidelink hybrid automatic repeat request (HARQ) response; and
   implementing, by the intermediary UE, sidelink feedback signaling processing avoiding an impending collision with respect to forwarding the sidelink feedback signaling to a base station over a network communication link and other uplink signaling to the base station over the network communication link, wherein the other uplink signaling comprises a base station and intermediary UE radio interface HARQ response for the intermediary UE, and wherein the implementing sidelink feedback signaling processing drops one of the sidelink feedback signaling or the other uplink signaling to communicate the other one of the sidelink feedback signaling or the other uplink signaling.

2. The method of claim 1, wherein the implementing sidelink feedback signaling processing comprises:
   identifying an overlap in an allocation of at least a time or frequency resource for use by the sidelink feedback signaling and the other uplink signaling as the impending collision with respect to forwarding the sidelink feedback signaling.

3. The method of claim 1, wherein the implementing sidelink feedback signaling processing comprises:
   determining to drop or communicate the sidelink feedback signaling based at least in part on a priority based sidelink feedback signaling rule implemented by the intermediary UE.

4. The method of claim 1, wherein the implementing sidelink feedback signaling processing comprises:
   determining to drop or communicate the sidelink feedback signaling based at least in part on a priority between the sidelink feedback signaling and at least a portion of the other uplink signaling.

5. The method of claim 4, wherein the priority between the sidelink feedback signaling and the at least a portion of the other uplink signaling is based at least in part on an index value associated with the other uplink signaling.

6. The method of claim 4, wherein the priority between the sidelink feedback signaling and the at least a portion of the other uplink signaling is based at least in part on a priority value associated with the sidelink feedback signaling.

7. The method of claim 6, wherein the priority value associated with the sidelink feedback signaling comprises a priority value of a sidelink transmission corresponding to the sidelink feedback signaling.

8. The method of claim 7, wherein the priority value of the sidelink transmission is based at least in part on a sidelink transmission priority selected from the group consisting of:
 a transmit block priority provided for a transmit block of the sidelink transmission;
 a transmit block size priority of a transmit block of the sidelink transmission; and
 a sidelink data retransmission priority of the sidelink transmission.

9. The method of claim 1, further comprising:
 identifying the impending collision with respect to forwarding the sidelink feedback signaling and the other uplink signaling from the intermediary UE, wherein the implementing sidelink feedback signaling processing comprises determining to drop the one of the sidelink feedback signaling or the other uplink signaling in association with the identifying the impending collision.

10. An apparatus configured for wireless communication, comprising:
 means for a user equipment (UE) operating as an intermediary UE of a sidelink communication link receiving sidelink feedback signaling from a UE operating as a sidelinked UE of the sidelink communication link, wherein the sidelink feedback signaling comprises a sidelink hybrid automatic repeat request (HARQ) response; and
 means for the intermediary UE implementing sidelink feedback signaling processing avoiding an impending collision with respect to forwarding the sidelink feedback signaling to a base station over a network communication link and other uplink signaling to the base station over the network communication link, wherein the other uplink signaling comprises a base station and intermediary UE radio interface HARQ response for the intermediary UE, and wherein the implementing sidelink feedback signaling processing drops one of the sidelink feedback signaling or the other uplink signaling to communicate the other one of the sidelink feedback signaling or the other uplink signaling.

11. The apparatus of claim 10, wherein the means for the intermediary UE implementing sidelink feedback signaling processing comprises:
 means for identifying an overlap in an allocation of at least a time or frequency resource for use by the sidelink feedback signaling and the other uplink signaling as the impending collision with respect to forwarding the sidelink feedback signaling.

12. The apparatus of claim 10, wherein the means for the intermediary UE implementing sidelink feedback signaling processing comprises:
 means for determining to drop or communicate the sidelink feedback signaling based at least in part on a priority based sidelink feedback signaling rule implemented by the intermediary UE.

13. The apparatus of claim 10, wherein the means for the intermediary UE implementing sidelink feedback signaling processing comprises:
 means for determining to drop or communicate the sidelink feedback signaling based at least in part on a priority between the sidelink feedback signaling and at least a portion of the other uplink signaling.

14. The apparatus of claim 13, wherein the priority between the sidelink feedback signaling and the at least a portion of the other uplink signaling is based at least in part on an index value associated with the other uplink signaling or is based at least in part on a priority value associated with the sidelink feedback signaling.

15. The apparatus of claim 14, wherein the priority value associated with the sidelink feedback signaling comprises a priority value of a sidelink transmission corresponding to the sidelink feedback signaling.

16. A non-transitory computer-readable medium having program code for wireless communication recorded thereon, the program code comprising:
 program code executable by a computer for causing the computer to
 receive, by a user equipment (UE) operating as an intermediary UE of a sidelink communication link, sidelink feedback signaling from a UE operating as a sidelinked UE of the sidelink communication link, wherein the sidelink feedback signaling comprises a sidelink hybrid automatic repeat request (HARQ) response; and
 implement, by the intermediary UE, sidelink feedback signaling processing avoiding an impending collision with respect to forwarding the sidelink feedback signaling to a base station over a network communication link and other uplink signaling to the base station over the network communication link, wherein the other uplink signaling comprises a base station and intermediary UE radio interface HARQ response for the intermediary UE, and wherein implementing sidelink feedback signaling processing drops one of the sidelink feedback signaling or the other uplink signaling to communicate the other one of the sidelink feedback signaling or the other uplink signaling.

17. The non-transitory computer-readable medium of claim 16, wherein the program code for causing the computer to implement sidelink feedback signaling processing comprises program code for causing the computer to:
 identify an overlap in an allocation of at least a time or frequency resource for use by the sidelink feedback signaling and the other uplink signaling as the impending collision with respect to forwarding the sidelink feedback signaling.

18. The non-transitory computer-readable medium of claim 16, wherein the program code for causing the computer to implement sidelink feedback signaling processing comprises program code for causing the computer to:
 determine to drop or communicate the sidelink feedback signaling based at least in part on a priority based sidelink feedback signaling rule implemented by the intermediary UE.

19. The non-transitory computer-readable medium of claim 16, wherein the program code for causing the computer to implement sidelink feedback signaling processing comprises program code for causing the computer to:

determine to drop or communicate the sidelink feedback signaling based at least in part on a priority between the sidelink feedback signaling and at least a portion of the other uplink signaling.

20. The non-transitory computer-readable medium of claim 19, wherein the priority between the sidelink feedback signaling and the at least a portion of the other uplink signaling is based at least in part on an index value associated with the other uplink signaling or is based at least in part on a priority value associated with the sidelink feedback signaling.

21. The non-transitory computer-readable medium of claim 20, wherein the priority value associated with the sidelink feedback signaling comprises a priority value of a sidelink transmission corresponding to the sidelink feedback signaling.

22. An apparatus configured for wireless communication, the apparatus comprising:
a processing system that includes at least one processor and memory coupled with the at least one processor, wherein the processing system is configured to cause the apparatus:
to receive, by a user equipment (UE) operating as an intermediary UE of a sidelink communication link, sidelink feedback signaling from a UE operating as a sidelinked UE of the sidelink communication link, wherein the sidelink feedback signaling comprises a sidelink hybrid automatic repeat request (HARQ) response; and
to implement, by the intermediary UE, sidelink feedback signaling processing avoiding an impending collision with respect to forwarding the sidelink feedback signaling to a base station over a network communication link and other uplink signaling to the base station over the network communication link, wherein the other uplink signaling comprises a base station and intermediary UE radio interface HARQ response for the intermediary UE, and wherein implementing sidelink feedback signaling processing drops one of the sidelink feedback signaling or the other uplink signaling to communicate the other one of the sidelink feedback signaling or the other uplink signaling.

23. The apparatus of claim 22, wherein the processing system configured to cause the apparatus to implement sidelink feedback signaling processing is configured to cause the apparatus to:
identify an overlap in an allocation of at least a time or frequency resource for use by the sidelink feedback signaling and the other uplink signaling as the impending collision with respect to forwarding the sidelink feedback signaling.

24. The apparatus of claim 22, wherein the processing system configured to cause the apparatus to implement sidelink feedback signaling processing is configured to cause the apparatus to:
determine to drop or communicate the sidelink feedback signaling based at least in part on a priority based sidelink feedback signaling rule implemented by the intermediary UE.

25. The apparatus of claim 22, wherein the processing system configured to cause the apparatus to implement sidelink feedback signaling processing is configured to cause the apparatus to:
determine to drop or communicate the sidelink feedback signaling based at least in part on a priority between the sidelink feedback signaling and at least a portion of the other uplink signaling.

26. The apparatus of claim 25, wherein the priority between the sidelink feedback signaling and the at least a portion of the other uplink signaling is based at least in part on an index value associated with the other uplink signaling.

27. The apparatus of claim 25, wherein the priority between the sidelink feedback signaling and the at least a portion of the other uplink signaling is based at least in part on a priority value associated with the sidelink feedback signaling.

28. The apparatus of claim 27, wherein the priority value associated with the sidelink feedback signaling comprises a priority value of a sidelink transmission corresponding to the sidelink feedback signaling.

29. The apparatus of claim 28, wherein the priority value of the sidelink transmission is based at least in part on a sidelink transmission priority selected from the group consisting of:
a transmit block priority provided for a transmit block of the sidelink transmission;
a transmit block size priority of a transmit block of the sidelink transmission; and
a sidelink data retransmission priority of the sidelink transmission.

30. The apparatus of claim 22, wherein the processing system is further configured to cause the apparatus:
to identify the impending collision with respect to forwarding the sidelink feedback signaling and the other uplink signaling from the intermediary UE, wherein the processing system configured to cause the apparatus to implement sidelink feedback signaling processing is configured to cause the apparatus to determine to drop the one of the sidelink feedback signaling or the other uplink signaling in association with identifying the impending collision.

* * * * *